United States Patent [19]

Reilly et al.

[11] Patent Number: 4,458,144
[45] Date of Patent: Jul. 3, 1984

[54] APPARATUS FOR READING INFORMATION STORED IN A TRACK PATTERN ON A RADIATION REFLECTING RECORD

[75] Inventors: Charles Reilly; Leonard Laub, both of Pasadena; Dennis Rose, Claremont, all of Calif.

[73] Assignee: Storage Technology Corporation, Louisville, Colo.

[21] Appl. No.: 279,100

[22] Filed: Jun. 30, 1981

[51] Int. Cl.³ .............................................. G01J 1/36
[52] U.S. Cl. ...................................... 250/204; 369/45
[58] Field of Search ............... 250/201, 204, 209, 570, 250/578, 550; 369/44, 45, 46

[56] References Cited

U.S. PATENT DOCUMENTS

| | | | |
|---|---|---|---|
| 3,974,327 | 8/1976 | Van Dijk | 250/201 |
| 4,006,293 | 2/1977 | Bouwhuis et al. | 358/128 |
| 4,051,527 | 9/1977 | Braat | 369/46 |
| 4,059,841 | 11/1977 | Bricot et al. | 250/570 |
| 4,152,586 | 5/1979 | Elliott et al. | 250/204 |

Primary Examiner—David C. Nelms
Attorney, Agent, or Firm—Woodcock, Washburn, Kurtz, Mackiewicz & Norris

[57] ABSTRACT

Apparatus for reading information stored in a track pattern on a radiation reflecting record comprises a source of radiation such as a laser for supplying at least a reading beam, an objective lens assembly for passing the reading beam to the record and for controllably focusing the reading beam at a plane of focus, a photodetector array disposed in an optical path with the lens assembly for sensing at least the recorded information and focusing errors, and an astigmatic element disposed in the optical path for producing an astigmatic image of the reading beam in which the photodetector array comprises a unitary data photodetector disposed for impingement thereon of a zero order reading beam component for sensing the recorded information, and a quadrant photodetector array adjacent to the unitary data photodetector and including separated sectors disposed along orthogonal axes for sensing relative differences of the astigmatic image along the orthogonal axes to provide at least focus error correction signals to the objective lens assembly.

11 Claims, 3 Drawing Figures

APPARATUS FOR READING INFORMATION STORED IN A TRACK PATTERN ON A RADIATION REFLECTING RECORD

This invention relates to optical systems for retrieving information recorded in the form of a pattern on a record or disc (an optical data storage disc). More particularly, this invention relates to optical systems including photodetector arrays suitable for detecting the recorded data and for detecting positioning errors of the optical system with respect to the disc. Positioning errors along the optical axis of the system are manifest as focusing errors while those in the plane perpendicular to the optical axis (i.e., in the plane of the disc) are manifest as tracking errors.

The present technology for high density, serial optical data recording depends upon the focusing of a beam of light to a very small spot (e.g., of submicron diameter) in order to minimize the required laser power as well as to maximize data density. Whereas commercially available machines (such as those based upon consumer video playback apparatus) have employed objective lens numerical apertures of the order of 0.45, the application of optical recording technology to high density data should utilize numerical apertures significantly closer to the theoretical maximum (1.0). The resulting small spot size, however, is not realized without attendant problems since the focusing and tracking problems associated with high numerical aperture optics and imperfect (uneven) discs are more severe. Thus improved optical systems, including detector geometries for high density data, as well as stringent focus and tracking error detection, are required.

It is known from numerous references (see, for example U.S. Pat. Nos. 4,025,949 and 4,079,247) that one can generate an optical focus error signal by introducing astigmatism into the beam reflected back from the recording medium to produce a diamond shaped image which varies in size according to the defocusing of the beam. A focus error signal can be obtained by imaging the astigmatic pattern on a quadrant detector, by comparing the energy incident along one axis of the detector with that along an orthogonal axis, and then deriving the needed focus error signal based upon the difference in incident energies along the two axes (H. Kogelnik and T. Li, *Applied Optics*, Vol. 5, No. 10, Page 1550).

It is also known that higher order spots can be produced by diffracting the read beam and, with the aid of additional sets of detectors arranged adjacent the quadrant detector, information may be obtained regarding the magnitude and direction of radial tracking errors (J. Braat and G. Bouwhuis, *Applied Optics*, Vol. 17, No. 13, Page 2013).

The methods of obtaining focus error and radial tracking error described briefly above are in use in the video disc industry. In the systems which make use of a four quadrant detector, it is common to take the sum of each of the four separate elements of the quadrant detector in order to recover the desired data signal (see U.S. Pat. No. 4,011,400). However, use of such segmented photodetector diodes for recovery of the data itself results in loss of some of the signal. Furthermore, at the high data rates and low error rates required for optical storage and retrieval of digital data, one cannot add the signals from different quadrant elements and keep such signals in proper phase relationship.

In accordance with the present invention, apparatus for recording information stored in a track pattern on a radiation reflecting record comprises a source of radiation such as a laser for supplying at least a reading beam. An objective lens means is provided for passing the reading beam to the record and for controllably focusing the reading beam at a plane of focus. A photodetector array is disposed in an optical path which includes the objective lens means and an astigmatic element which produces an astigmatic image of the reading beam. The photodetector array comprises a unitary data photodetector disposed for impingement thereon of a zero order reading beam component for sensing the recorded information and a quadrant photodetector array adjacent to the data photodetector. The quadrant photodetector includes separated sectors disposed along orthogonal axes for sensing relative differences of the astigmatic image along the orthogonal axes to provide at least focus error correction signals to the objective lens means.

These and other aspects of the present invention will become apparent from a consideration of the following description and the attached drawing in which.

Figure 1:
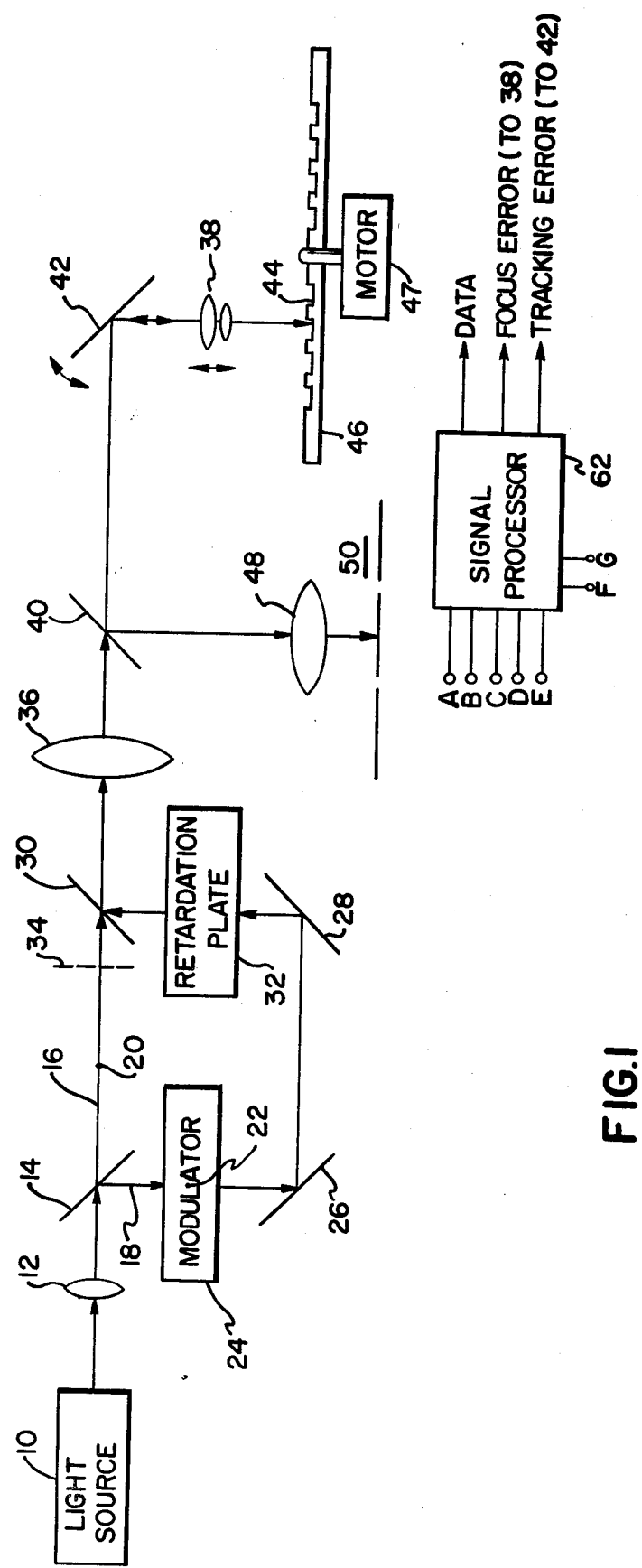
FIG. 1 illustrates in schematic diagram form a direct read after write (DRAW) apparatus embodying the invention.

Referring to FIG. 1 in a direct read after write (DRAW) system for storing and retrieving information, a source of illumination 10, for example, a HeNe gas laser or an AlGaAs diode laser, emits radiation which is focused by a lens 12. The resulting focused beam is split by a partially transmitting mirror 14 into a read beam 16 and a write beam 18. The read beam 16 is focused at a position 20 while the write beam 18 is focused at a position 22. If the source of illumination 10 is not capable of being modulated internally, then the write beam 18 is modulated in accordance with the information to be recorded by an active optical modulating device 24 such as an acousto-optic or electro-optic modulator. The modulated write beam output of modulating device 24 is reflected by mirrors 26, 28 to a beam combiner 30 such as a partially transmitting mirror. Typically, a wave retardation plate 32 is inserted in the write beam path and, in that case, combiner 30 may be a polarization beam combiner.

The read beam 16, after being brought to a focus at position 20, is diffracted, for example, by a diffraction grating 34 to provide at least a zero order beam component and a pair of first order beam components. It should be noted that the diffraction function can be accomplished at other points in the system as will be apparent to persons familiar with this art. In the arrangement shown in FIG. 1, the diffracted and undiffracted beam components are each transmitted by combiner 30.

The combined read and write radiation passes through a lens system 36 which optimizes the diameter and wave front of the radiation for passage through a positionable objective lens system 38. After passing through lens system 38, the combined radiation passes through a further partially transmitting mirror 40 and is reflected by a controllably positioned device 42 such as a mirror mounted on a galvanometer. Device 42 will hereinafter be referred to as tracking mirror 42.

The read and write beams reflected by tracking mirror 42 are then focused by the objective lens system 38 at a recording medium 44. Recording medium 44 is disposed on a rotatable disc 46. A motor 47 drives the disc 46 in a predetermined manner.

The spatial separation between the zero order read beam spot and either of the first order read beam spots at the recording medium 44 is of the order of a few microns and is determined by the distance between focus 20 and grating 34, the efl of lens 36, the efl of objective 38, the grating frequency (of grating 34) and the wavelength of the radiation of write beam 16.

A portion of the read beam radiation is reflected by the recording medium 44, collected by the objective lens system 38, reflected by the tracking mirror 42, and reflected by the partially transmitting mirror 40 into a detection path including an astigmatic lens assembly 48 and a detector array 40.

Figure 2:
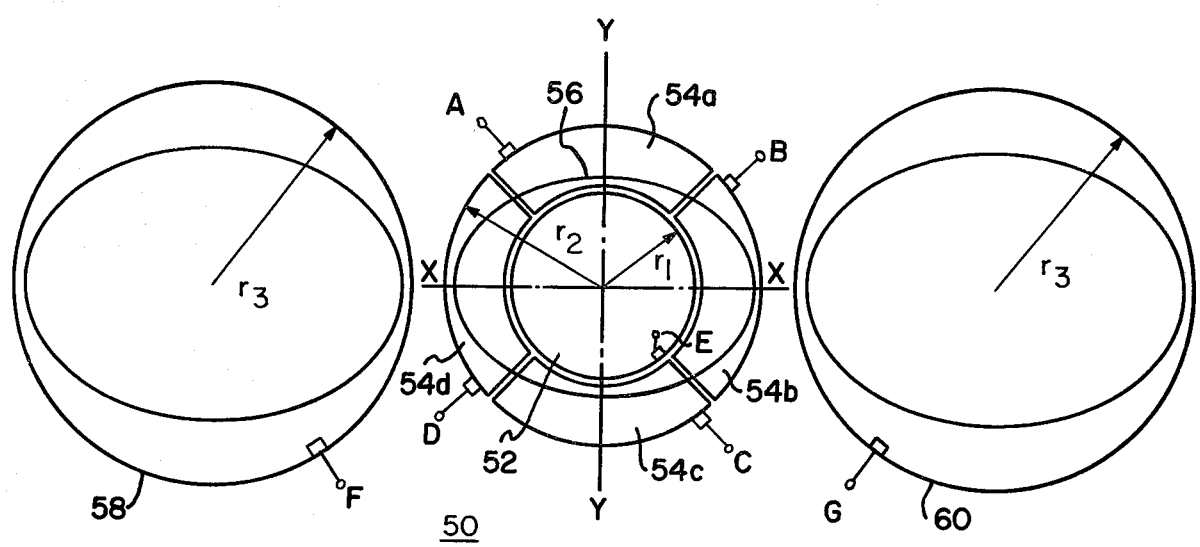
FIG. 2 shows a detection system for use in the apparatus of FIG. 1.

A plan view of detector array 50 is shown in FIG. 2. As shown in FIG. 2, and in accordance with one aspect of the present invention, detector array 50 comprises a unitary photosensitive data detection element 52 arranged for impingement by a zero order reflected beam component and having an effective outer radius of a first value $r_1$ associated with its data detection area. Detector array 50 further comprises at least one quadrant photodetector 54 having an effective outer radius $r_2$ associated with its detection area, where $r_2$ is greater than $r_1$. The quadrant photo-detector 54 comprises four sectors 54a, 54b, 54c and 54d and has axes of symmetry X—X and Y—Y oriented for substantial alignment with the axes of an astigmatic (elliptical) read beam pattern 56 which impinges on detector array 50.

Detector array 50 further comprises auxiliary photodetectors 58 and 60 disposed on opposite sides of the detector array 52,54 and appropriately spaced for impingement thereon of first order beam components as will appear below. Preferably, the auxiliary photodetectors 58, 60 are of greater radius ($r_3$) as compared to quadrant photo-detector 54 and data photo-detector 52 (i.e. $r_3 > r_2 > r_1$). Output signals are derived from each of the detector elements at output terminals A, B, C, D, E, F and G as shown in FIG. 2. The respective output signals are combined in a signal processor 62 (FIG. 1) to produce a data signal output, a focus error output and a tracking error output as will appear below.

In the operation of the apparatus of FIGS. 1 and 2, the spatial separation at detector array 50 between the zero order reflected spot and the first order reflected spots is determined by the magnification of the optical train from the recording medium 44 to the detector array 50 and by the spatial separation of the zero and first order beam spots at the recording medium 44. As the recording medium 44 moves out of the focal plane of objective lens 38 in one direction, the astigmatic pattern along axis X—X of detector element 52 (as well as detector 58, 60) increases in length (and area) while the pattern along axis Y—Y decreases in length (and area). When the recording medium 44 moves out of the focal plane in the opposite direction, the pattern along axis X—X decreases in length (and area) while that along axis Y—Y increases in length (and area). Stated in terms of the power incident on the quadrants of the photodetector 54, a focus error signal (FES) may be expressed as $$FES = (P_{54d} + P_{54b}) - (P_{54a} + P_{54c}).$$

The focus error signal may thus be derived by simple algebraic combination in signal processor 62 of the outputs of the four photodetector elements 54a–54d according to the foregoing expression. The focus error signal is applied in a well-known manner to, for example, a voice coil motor assembly (not shown) associated with movable objective lens assembly 38 to maintain the desired focused condition at recording medium 44.

The energy incident on detector elements 58 and 60 which results from the first order reflected spots, can be processed in signal processor 62 (e.g. the outputs from detectors 58 and 60 are subtracted one from the other) to provide an error (difference) signal indicative of the magnitude and direction of the radial tracking error. The resulting radial tracking error signal is applied to the galvanometer coil (not shown) of tracking mirror 42 to align the energy incident on recording medium 44 with the recorded information tracks.

In order to avoid problems encountered in the prior art related to loss of data signal level and undesired phasing errors which result from recovering recorded data signals by means of a quadrant detector, the arrangement of FIGS. 1 and 2 is arranged to recover the recorded data signal by means of the unitary photodetector element 52. As noted above, data photodetector element 52 is located within the quadrant detector elements 54a–54d. Furthermore, a single data signal lead E is associated with data detector element 52. The zero order spot is incident on data detector element 52 and that element 52 is dimensioned slightly larger (e.g., approximately 15% larger) in diameter than the incident beam in order to avoid edge effects and to permit the data signal output to be of relatively unvarying maximum amplitude (e.g., within ±2%) over the control range of the focusing system, while minimizing noise generated by detector element 52.

The surrounding quadrant detector elements 54a–54d are, as is desired, of greater diameter than the data element 52 to provide an adequate capture range for the focus control arrangement.

In accordance with a further aspect of this invention, radial tracking error information is derived by comparing the energy incident upon quadrant detector elements 54b and 54d. In that case, the additional detectors 58 and 60 can be eliminated along with the grating 34. All of the information (data, focus error and tracking error) can be derived from the zero order beam alone. The optical efficiency of the system thereby may be improved. It should be recognized, however, that adequate radial tracking error information level must still be available. In order to obtain radial tracking error information from detector elements 54d and 54b, in some applications it will be advantageous to dither the read beam back and forth through a small angle via an active optical device (not shown) such as a flat window mounted on a resonant scanner. Beam dithering is described, for example, by G. Bouwhuis and J. Braat, *Applied Optics*, Vol. 17, No. 13 at page 1993. Alternatively a pre-recorded track pattern may be placed on disc 46 to provide the equivalent of the effect of beam dithering when needed.

The proportioning of the radius $r_1$ of the data detector element 52 as compared to the outer radius $r_2$ of the quadrant detector elements 54a–54d is a significant design choice since it determines how much of the incident zero order beam energy is used for data detection and how much is used for focus error detection. In one typical arrangement, the dimension $r_1$ was chosen to be $120\times10^{-6}$ meters while the dimension $r_2$ was chosen to be $250\times10^{-6}$ meters.

Figure 3:
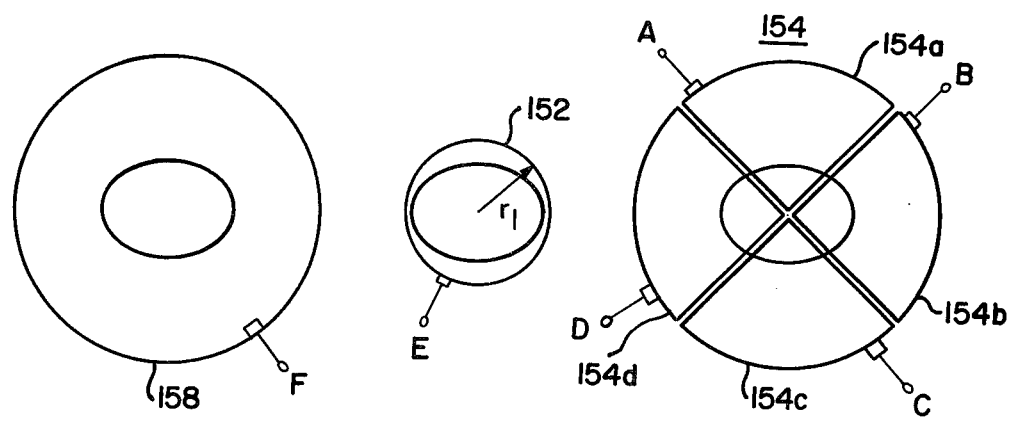
FIG. 3 shows an alternative detection system for use in the apparatus of FIG. 1.

An alternative arrangement for realizing some of the benefits of the arrangement illustrated in FIGS. 1 and 2 is illustrated in FIG. 3. Referring to FIG. 3, a data photodetector element 152 is disposed for impingement thereon of a zero order beam component. Data detector element 152 is of relatively small radius $r_1$ to minimize noise but is approximately 15% larger than the maximum dimension of the incident beam in order to avoid edge effects and to permit the data signal to remain relatively constant throughout the range of operation of the focus control system (as noted above in connection with FIG. 2).

A quadrant detector comprising elements 154a, 154b, 154c and 154d is disposed adjacent to data detector element 152 and is arranged for impingement of a first order beam to detect focus errors in the manner noted above in connection with FIG. 2. The outer radius of quadrant detector 154 preferably is several times larger than the maximum dimension of the focused astigmatic beam pattern to provide a capture range for the focus control system which is practical. Radial tracking error is provided by means of the arrangement of FIG. 3 by comparing the output from a further first order beam detector element 158 with the sum of the outputs from quadrant detector elements 154a–154d. It should be noted that the problems associated with utilizing a quadrant detector such as detector 154 for recovering data are not encountered where detector 154 is utilized for error (focus error) detection since the rate at which the focus error signal occurs is substantially lower and the accuracy of the error signal is less critical as compared to recovery of the recorded data signal.

It should be noted that, as was described in connection with FIGS. 1 and 2, the detector array of FIG. 3 would make use of a grating such as grating 34 in FIG. 1 to generate the first order beam components. Preferably, the grating 34 is imaged at the entrance pupil of the objective lens assembly 38 (which itself would be fixed). The chief rays of the zero order beam and the first order beams then will be parallel when incident on the recording medium 44 and the spatial separation of the zero and first order spots at the detector array (50, 150) will not change as the recording medium 44 moves in and out of focus. In this manner, cross talk between radial tracking error and focus error signals will be minimized.

As was noted in connection with the array of FIG. 2, if the read beam is dithered in a system employing the detector array of FIG. 3, detector element 158 (but not grating 34) may be eliminated and radial tracking error may be detected by means of elements 154d and 154b.

It should also be noted that a normalized focus error signal may be derived according to the following relationship of the power P incident on the several elements of the illustrated quadrant photodetector:

$$FES = \frac{(P_{154b} + P_{154d}) - (P_{154a} + P_{154c})}{(P_{154a} + P_{154b} + P_{154c} + P_{154d})}.$$

where, for example, $P_{154b}$ refers to the power incident on element 154b of the illustrated quadrant photodetector Various additional modifications may be made within the scope of the invention which is set forth in the following claims.

What is claimed is:

1. Apparatus for reading information stored in a track pattern on a radiation reflecting record comprising:
    a source of radiation for supplying at least a reading beam;
    objective lens means for passing said reading beam to said record and for controllably focusing said reading beam at a plane of focus;
    a photodetector array disposed in an optical path with said lens means for sensing at least said recorded information and focusing errors;
    an optical element disposed in said optical path for producing an astigmatic image of said reading beam; and
    diffraction means for separating said reading beam into at least zero-order and first-order components;
    said photodetector array comprising:
    a unitary data photodetector disposed for impingement thereon of said zero-order reading beam component for sensing said recorded information; and
    a quadrant photodetector array adjacent to said unitary data photodetector and including separated sectors disposed along orthogonal axes for sensing relative differences of said astigmatic image of said first-order component of said beams along said orthogonal axes to provide at least focus error correction signals to said objective lens means.

2. Apparatus according to claim 1 wherein:
    said unitary data photodetector is generally circular and has an outer boundary defined by a radius $r_1$ and said quadrant photodetector array is generally circular and has an outer boundary defined by a radius $r_2$, where $r_2$ is greater than $r_1$.

3. Apparatus according to claim 2 wherein said diffraction means comprises:
    grating means disposed between said source of radiation and said photodetector array for separating said reading beam into at least zero-order and first-order components; and
    said quadrant photodetector array is disposed adjacent to said unitary data photodetector for impingement thereon of said first-order component.

4. Apparatus according to claim 1 wherein:
    said quadrant photodetector array surrounds said unitary data photodetector and is disposed for impingement thereon of a zero order reading beam component.

5. Apparatus according to claim 4 wherein:
    said quadrant photodetector array comprises four sectors separated from each other and from said unitary data photodetector and proportioned for impingement thereon of outermost portions of said astigmatic image.

6. Apparatus according to claim 5 wherein:
    said unitary data photodetector is generally circular and has an outer boundary defined by a radius $r_1$ and said quadrant photodetector array is generally circular and has an outer boundary defined by a radius $r_2$, where $r_2$ is greater than $r_1$.

7. Apparatus according to claim 1 wherein said quadrant photodetector array is arranged to output first, second, third, and fourth signals and further comprising:
    means coupled to said quadrant photodetector array or summing output signals from second and fourth ones of said quadrants to produce a first sum signal, for summing output signals from first and third ones of said quadrants to produce a second sum signal and for subtracting said second sum signal from said first sum signal to provide a focus error signal.

8. Apparatus according to claim 1 wherein said quadrant photodetector array is arranged to output first, second, third and fourth signals and further comprising:
means coupled to said quadrant photodetector array for comparing output signals from second and fourth ones of said quadrants to produce a tracking error signal.

9. A photodetector array for use in an apparatus for reading information stored in a track pattern on a radiation reflecting record, in which a source of radiation is provided for supplying at least a reading beam, an objective lens means is provided for passing the reading beam to the record and for controllably focusing the reading beam at a plane of focus, beam diffraction means are provided for separating zero- and first-order components of said reading beam, and an optical element is disposed in an optical path including the objective lens means and the photodetector array for producing an astigmatic image of the reading beam, the photodetector array comprising:

a unitary data photodetector disposed for impingement thereon of said zero-order reading beam component for sensing said recorded information; and
a quadrant photodetector array adjacent to said unitary data photodetector and including separated sectors disposed along orthogonal axes for sensing relative differences of said first-order components of said astigmatic image along said orthogonal axes to provide at least focus error correction signals to said objective lens means.

10. A photodetector array according to claim 9 wherein:
said unitary data photodetector is generally circular and has an outer boundary defined by a radius $r_1$ and said quadrant photodetector array is generally circular and has an outer boundary defined by a radius $r_2$, where $r_2$ is greater than $r_1$.

11. A photodetector array according to claim 9 wherein:
said quadrant photodetector array surrounds said unitary data photodetector and is disposed for impingement thereon of said first order reading beam component.

* * * * *